(No Model.)
K. G. STREETER.
GLOVE FASTENING.
No. 247,964. Patented Oct. 4, 1881.
Fig: 1.
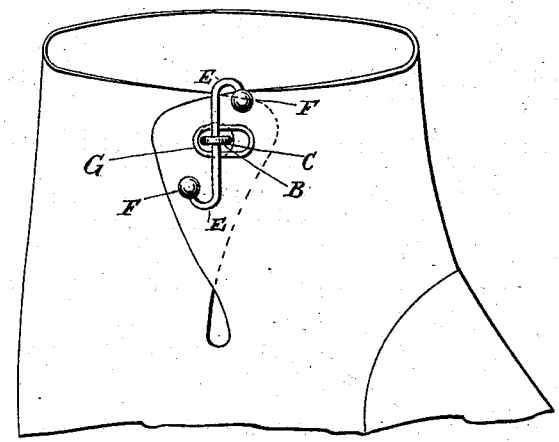
Fig: 2.
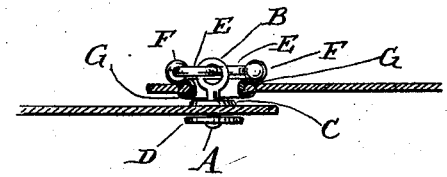
Fig: 3.
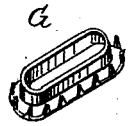
WITNESSES:
Chas Nida
C. Sedgwick
INVENTOR:
K. G. Streeter
BY Munn & Co
ATTORNEYS.

United States Patent Office.

KING G. STREETER, OF LITTLETON, NEW HAMPSHIRE.

GLOVE-FASTENING.

SPECIFICATION forming part of Letters Patent No. 247,964, dated October 4, 1881.

Application filed July 19, 1881. (No model.)

*To all whom it may concern:*

Be it known that I, KING G. STREETER, of Littleton, in the county of Grafton and State of New Hampshire, have invented a new and useful Improvement in Glove-Fastenings, of which the following is a full, clear, and exact description.

In the accompanying drawings, Figure 1 represents my improvement applied to a glove. Fig. 2 is a section of the same. Fig. 3 is a perspective view of the long eyelet.

Similar letters of reference indicate corresponding parts.

The object of this invention is to facilitate the fastening of gloves and increase the durability of the fastenings.

The invention consists in a glove-fastening constructed with a tubular shank having an eye at one end, a fixed washer near its other end, and a loose washer, a rod passing through the eye and having its ends bent into hook form, and provided with knobs and the elongated eyelet, whereby the glove can be readily fastened and unfastened, and the glove-wrist will be kept from being worn or torn, as will be hereinafter fully described.

A represents a hollow or tubular shank, which has an eye, B, formed upon or attached to it at one end, and a washer, C, secured to it by solder or other suitable means near its other end. The washer C is placed at such a distance from the end of the shank A that the said end of the shank can pass through a hole in the wrist of the glove, pass through a loose washer, D, upon the inner side of the said wrist, and be riveted down upon the said loose washer D.

E is a wire or rod, which is passed through the eye B and has its ends bent in opposite directions into semicircular or hook form, and a knob, F, formed upon or attached to each of the said ends, the said knobs being of such a size that they will not pass through the eye B.

In using the fastener, one end of the wire or rod E is passed through the button-hole in the glove-wrist, and the said rod is then used as a lever to draw the parts of the said glove-wrist together. The other end of the rod E is then passed through the button-hole, and the said rod is slipped through the eye B until its middle part is in the said eye, as shown in Figs. 1 and 2.

G is an elongated eyelet, which is inserted in the button-hole of the glove-wrist, and is secured in place by riveting down the inner end of its tube in the manner of an ordinary eyelet. The flange around the outer end of the eyelet G has teeth or points formed upon its outer edge to enter the wrist of the glove and prevent the said eyelet from moving out of place. The opening through the eyelet G is made of such a size that the knobs F of the rod E can be readily passed through it. The eyelet G prevents the glove-wrist from being worn or torn around the button-hole.

Having thus described my invention, I claim as new and desire to secure by Letters Patent—

In glove-fastenings, the combination of the wire E, having both ends provided with hooks and knobs, the tubular shank A, with eye B, the washer C, made fast to the shank, the loose washer D, and the oblong or elongated washer G, to allow the device to be used as described.

K. G. STREETER.

Witnesses:
H. H. SOUTHWORTH,
F. H. ENGLISH.